United States Patent
Malmqvist et al.

(10) Patent No.: US 8,416,126 B2
(45) Date of Patent: Apr. 9, 2013

(54) OBTAINING A CALIBRATION PARAMETER FOR AN ANTENNA ARRAY

(75) Inventors: Håkan Malmqvist, Skarpnäck (SE); Leonard Rexberg, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 230 days.

(21) Appl. No.: 12/957,949

(22) Filed: Dec. 1, 2010

(65) Prior Publication Data

US 2012/0139776 A1    Jun. 7, 2012

(51) Int. Cl.
*G01S 7/40* (2006.01)
*H01Q 3/26* (2006.01)

(52) U.S. Cl. ............... 342/174; 342/368; 455/67.14

(58) Field of Classification Search ........ 342/174, 342/368; 455/67.14
See application file for complete search history.

(56) References Cited

U.S. PATENT DOCUMENTS

| | | | |
|---|---|---|---|
| 5,657,023 A | 8/1997 | Lewis et al. | |
| 5,864,317 A | 1/1999 | Boe et al. | |
| 6,339,399 B1 | 1/2002 | Andersson et al. | |
| 6,496,140 B1 * | 12/2002 | Alastalo | 342/174 |
| 6,870,878 B1 | 3/2005 | Doi et al. | |
| 7,471,237 B2 * | 12/2008 | Wooldridge | 342/174 |
| 7,714,776 B2 * | 5/2010 | Cooper et al. | 342/174 |
| 8,199,048 B1 * | 6/2012 | Medina Sanchez | 342/174 |
| 2008/0012748 A1 * | 1/2008 | Ahn | 342/21 |
| 2011/0319034 A1 * | 12/2011 | Boe et al. | 455/67.14 |

FOREIGN PATENT DOCUMENTS

WO    2010017706 A1    2/2010

* cited by examiner

*Primary Examiner* — John B Sotomayor
*Assistant Examiner* — Matthew M Barker
(74) *Attorney, Agent, or Firm* — Coats & Bennett, P.L.L.C.

(57) ABSTRACT

Embodiments herein include a method for obtaining a calibration parameter for an antenna array. The antenna array comprises a first and a second radio module with respective associated antennas, wherein both radio modules comprise a main transmitter and a connected calibration receiver or both radio modules comprise a main receiver and a connected calibration transmitter. The method comprises: injecting a first calibration signal in the first radio module and measuring a first response to the first calibration in the first radio module. This injecting and measuring is repeated for all combinations of the first and second radio modules. Finally, a numerical value is calculated using the responses; a calibration parameter is calculated based on the calculated numerical value. Embodiments herein also include a corresponding antenna array, computer program and computer program product.

18 Claims, 7 Drawing Sheets

OBTAINING A CALIBRATION PARAMETER FOR AN ANTENNA ARRAY

TECHNICAL FIELD

Embodiments herein relate to an antenna array, and more particularly to obtaining at least one calibration parameter for an antenna array.

BACKGROUND

The increasing demand for capacity in cellular systems has led to the 3GPP (3rd Generation Partnership Project) mobile system standard evolving into what is called LTE (Long Term Evolution) and LTE Advanced. This has opened up for the use of more advanced antenna technology. In particular, antenna array techniques such as MIMO (Multiple Input Multiple Output) or beam-forming are often applied.

Antenna arrays have previously been used in radar and satellite communication applications. In order to form beams, an antenna array has to be phase aligned or calibrated at the antenna ports. This is often a time consuming and expensive measurement process performed once at an antenna measurement range before deployment. However, commercial antennas in the mobile radio industry drive requirements for a self-contained swift calibration method that also can be performed regularly on-line, i.e. during operation.

Several proposals for calibration methods exist in the industry today. It is known in the art how to inject a calibration signal into the TX radio chains and sample a small portion of the radio signals close to the antenna ports, e.g. using a directional coupler. By feeding the sampled output signal and the TX radio chain input signal (including the injected calibration signal) to a signal correlator, a phase, gain and delay correction could be calculated and inserted in the radio chain, preferably in the digital base-band part. A general method for this type of antenna calibration is described in U.S. Pat. No. 6,339,399. However, methods of this type incorporate a network of calibration couplers connected by switches or summing resistors to some calibration receiver. These calibration chains will introduce errors if not properly phase aligned by design or properly characterized and corrected for. Methods of this type simply presuppose the calibration network characteristics to be known, which is a significant requirement.

Another method known in the art is applicable to TDD (Time Division Multiplexing) systems only. The idea is to use the antenna array mutual coupling in order to get a calibration signal back into the system for correlation and calculating the required corrections for both RX and TX radio chains. RX and TX radio chains are used alternately in TDD, but this type of calibration requires some of the TX and RX chains to be used simultaneously and not alternately, forcing the insertion of dedicated calibration time periods devoid of normal radio traffic. This type of calibration also presupposes uniformity in the mutual coupling between antenna elements. A method along these lines is described in U.S. Pat. No. 5,657,023. However, the described method is restricted to TDD applications, leaving the large area of FDD (Frequency Division Multiplexing) unsolved. Furthermore, the described method presupposes uniformity in the antenna mutual coupling. Another drawback is the need to insert dedicated calibration time periods into the regular radio traffic.

SUMMARY

An object of embodiments herein is to provide improved calibration for antenna arrays.

A first aspect is a method for obtaining at least one calibration parameter for an antenna array. The antenna array comprises a first and a second radio module, a first antenna and a second antenna respectively connected to the first and second radio modules, wherein the first and second radio modules each comprises a main transmitter and a selectively connectable calibration receiver or the first and second radio modules each comprises a main receiver and a selectively connectable calibration transmitter. The method comprises: injecting a first calibration signal in the first radio module and measuring a first response to the first calibration signal in the first radio module; injecting a second calibration signal in the first radio module such that the calibration signal passes over mutual coupling of the antennas to the second radio module, and measuring a second response to the second calibration signal in the second radio module; injecting a third calibration signal in the second radio module and measuring a third response to the third calibration signal in the second radio module; injecting a fourth calibration signal in the second radio module such that the calibration signal passes over mutual coupling of the antennas to the first radio module and measuring a fourth response to the fourth calibration signal in the first radio module; calculating at least one numerical value using the first, second, third and fourth responses; and calculating at least one calibration parameter based on the calculated numerical value.

The method is applicable to both FDD and TDD, and can be performed on-line, i.e. during traffic. Moreover, the method is self-contained, i.e. does not rely on any external equipment or facility and can be performed autonomously without operator involvement.

The measuring a first, second, third and fourth response may each comprise correlating a respective response with a respective calibration signal.

The measuring a first, second, third and fourth response may each comprise measuring a magnitude being phase, delay or logarithmic gain and wherein the at least one calibration parameter may be directed towards adjusting the magnitude that is measured to approach a desired value of the magnitude.

When the first and second radio modules comprise a respective main transmitter, the injecting a first, second, third and fourth calibration signal may comprise injecting regular input signals for transmission as calibration signals.

When the first and second radio modules comprise a respective main receiver, the method may further comprise calculating at least one cancellation parameter using the numerical value, applying the at least one cancellation parameter, subtracting the injected calibration signal from the response received by the main receivers.

The calculating at least one numerical value may comprise performing numerical combination of mean values and differences of the first, second, third and fourth responses.

The method may further comprise applying the at least one calibration parameter to one of the first and second radio modules.

The method may be repeated when there is any radio module for which at least one calibration parameter remains to be calculated and, wherein, in the repeated execution, at least one of the first and second radio modules is a radio module used in a previous execution of the method.

During the repeated execution, a previously utilised calibration receiver or calibration transmitter may be reused to form part of a radio module used in the repeated execution.

The first and second radio modules may be connected to separate calibration networks. For example, a plurality of antenna array modules may be arranged such that the antenna array modules cooperate to achieve desired radio characteristics. Each antenna array module comprises a plurality of antennas and a respective calibration network. In such an arrangement, the first and second radio module may be part of separate antenna array modules whereby calibration across antenna array modules is made possible.

The method may be repeated after an idle period.

A second aspect is an antenna array comprising a controller a first and a second radio module, a first antenna and a second antenna respectively connected to the first and second radio modules, wherein the first and second radio modules each comprises a main transmitter and selectively connectable calibration receiver or the first and second radio modules each comprises a main receiver and selectively connectable calibration transmitter. The antenna array may be arranged to inject a first calibration signal in the first radio module and measure a first response to the first calibration signal in the first radio module; inject a second calibration signal in the first radio module such that the calibration signal passes over mutual coupling of the antennas to the second radio module, and measure a second response to the second calibration signal in the second radio module; inject a third calibration signal in the second radio module and measure a third response to the third calibration signal in the second radio module; inject a fourth calibration signal in the second radio module such that the calibration signal passes over mutual coupling of the antennas to the first radio module and measure a fourth response to the fourth calibration signal in the first radio module. The controller is arranged to calculate at least one numerical value using the first, second, third and fourth responses; and to calculate at least one calibration parameter based on the calculated numerical value.

At least one radio module may further comprise an adjuster arranged to apply the at least one calibration parameter. The adjuster may comprise a FIR, finite impulse response, filter.

The antenna array may further comprise a calibration network for selectively connecting a calibration receiver or calibration transmitter within a radio module.

The antenna array may further comprise a plurality of calibration networks for selectively connecting a calibration receiver or calibration transmitter within a radio module. Each radio module may further comprise a controllable multidirectional coupler and the calibration receiver or calibration transmitter may be connected within each radio module via the controllable multidirectional coupler.

When the first and second radio modules comprise a respective main receiver, the controller may be arranged to calculate at least one cancellation parameter, based on calculated at least one numerical value from the first, second, third or fourth responses, for subtracting the calibration signal from the signal received by the main receivers.

The antenna array may further comprise an adjuster arranged to apply the at least one cancellation parameter to obtain an adjusted signal and a subtractor arranged to subtract the adjusted signal from the response received by a main receiver.

A third aspect is a computer program for obtaining at least one calibration parameter for an antenna array. The antenna array comprises at least a first and a second radio module, a first antenna and a second antenna respectively connected to the first and second radio modules, wherein the first and second radio modules each comprises a main transmitter and a selectively connectable calibration receiver or the first and second radio modules each comprises a main receiver and a selectively connectable calibration transmitter. The computer program comprises computer program code which, when run on a controller of the antenna array, causes the controller to perform: injecting a first calibration signal in the first radio module and measuring a first response to the first calibration signal in the first radio module; injecting a second calibration signal in the first radio module such that the calibration signal passes over mutual coupling of the antennas to the second radio module, and measuring a second response to the second calibration signal in the second radio module; injecting a third calibration signal in the second radio module and measuring a third response to the third calibration signal in the second radio module; injecting a fourth calibration signal in the second radio module such that the calibration signal passes over mutual coupling of the antennas to the first radio module and measuring a fourth response to the fourth calibration signal in the first radio module; calculating at least one numerical value using the first, second, third and fourth responses; and calculating at least one calibration parameter based on the calculated numerical value.

A fourth aspect is a computer program product comprising a computer program according to the third aspect and a computer readable means on which the computer program is stored.

It is to be noted that any feature of the first, second, third, and fourth aspects may, where appropriate, be applied to any other of these aspects.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1A:
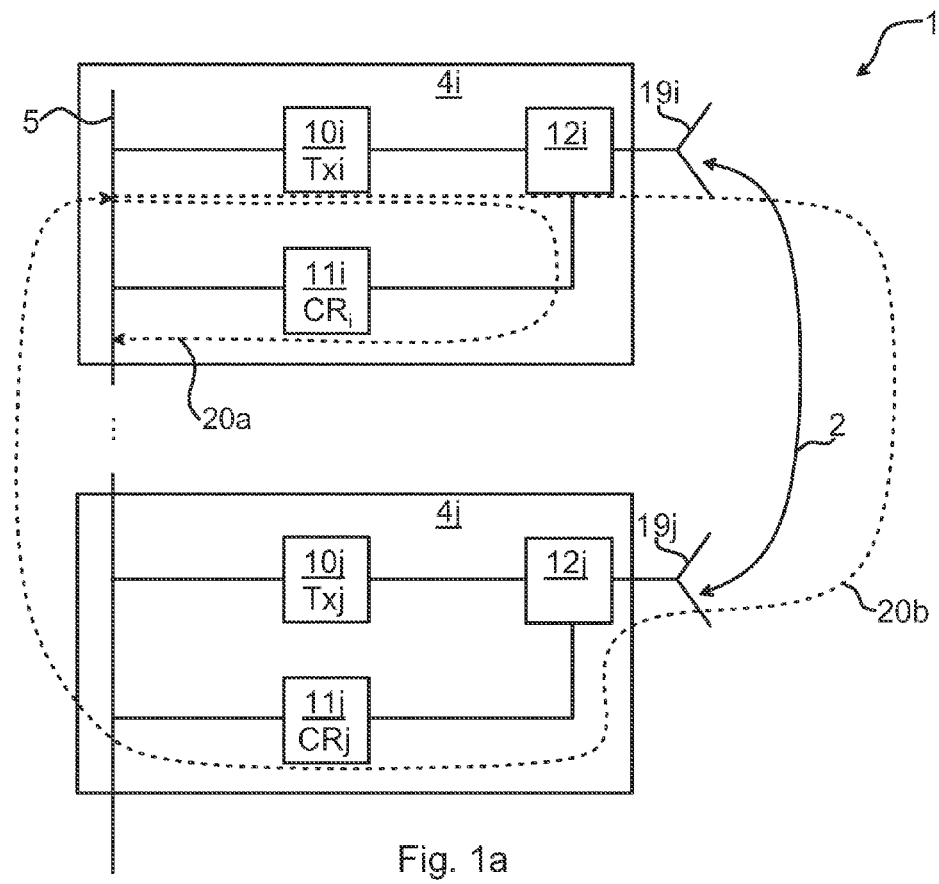
FIGS. 1A-1B are schematic diagrams showing an embodiment utilising main transmitters and calibration receivers.

Embodiments herein will now be described more fully with reference to the accompanying drawings. The described embodiments, however, are merely example embodiments and should not be construed as limiting. Like numbers refer to like elements throughout the description.

Overview

An object of embodiments herein is to provide a general autonomous on-line calibration for antenna arrays, i.e. a calibration that can be performed regularly without operator intervention during normal traffic operation covering diverse access technologies such as FDD and TDD. Moreover, the problem of characterisation or uniform design of auxiliary calibration paths to a high precision, necessary for methods for FDD known in the art is removed. Also, constraints in uniformity of antenna element mutual coupling, necessary for TDD methods known in the art is removed and in fact, this mutual coupling can be calculated and advantageously used in critical beam-forming applications.

A method is described below for obtaining calibration parameters for an antenna array. The method implicitly uses mutual coupling between antenna elements as part of the calibration of radio modules in an antenna array or several antenna array modules working together. The antenna array or antenna array module comprises at least two transmitting radio modules and/or two receiving radio modules each with an associated antenna, each radio module comprising a transmitter or a receiver. In addition to the mutual coupling between antenna elements, the method also uses calibration elements comprising at least one calibration receiver or calibration transmitter in addition to a specific path in a calibration network for tapping off or injecting a calibration signal at a coupling point close to each antenna port. Furthermore, this coupling point may provide for tapping off from both the radio and antenna side as well as for injecting into both the radio and the antenna sides, the direction selectable e.g. by a switch.

The calibration elements together with the antenna mutual coupling allows the setting up of four specific measurement paths encompassing a pair of radio modules, either transmitter modules or receiver modules, for the relative calibration of these radio modules. The setting up of a measurement path involves the injection of a calibration signal either in a transmitter radio module or via a calibration transmitter into a receiver radio module, the injected signal being received either in the calibration receiver connected to a transmitter radio module or in a receiver radio module. The injection and receiving points can be associated with the same radio modules or with different radio modules in the pair of radio modules involved. There are four such combinations, thus giving the four specific measurement paths and responses.

A reference plane is defined where the injected and received signals are compared, e.g. in a signal correlator, resulting in a response, from which numerical measurement values can be calculated, representing e.g. signal aspects such as gain, phase and delay over frequency for each measurement path. From the measurement values of the four measurement paths it is possible to calculate relative calibration parameters that can be applied to either of the two radio modules in the actual pair.

These steps of injection, measurement, calculation and calibration parameter application can be repeated, successively including other radio modules, until all radio modules of the antenna array have been included in at least one procedure and an unbroken chain of relative calibrations between pairs of radio modules have been established. This concludes the calibration method, which can be repeated after an idle period.

The method can also encompass radio modules with their corresponding antenna elements positioned in separate antenna array modules, the antenna array thus comprising a configuration of several antenna array modules. In this case a delay can occur along the reference plane, representing a signal propagation time between modules. The method does not presuppose that this delay is known and corrected for. Phase and gain is usually of no concern for this part of a measurement path as the reference plane can be positioned in the domain of radio digital base band.

Furthermore, by using an appropriate calibration signal, e.g. a low power spread spectrum signal, the whole calibration method can take place on-line, i.e. during normal traffic operation of the antenna array. A wide bandwidth calibration signal also allows the calculation of correct adjustments to phase, gain and delay over the entire used frequency band from the same measurements.

The method is applicable to both FDD (Frequency Division Multiplexing) and TDD (Time Division Multiplexing). Moreover, the method is self-contained, i.e. does not rely on any external equipment or facility and can be performed autonomously without operator involvement.

When calibrating transmitter radio modules, the steps of injecting a calibration signal may instead comprise the use of regular input signals intended for transmission as calibration signals.

When calibrating receiver radio modules, the method may also comprise calculating cancellation parameters from the measurement values and, applying the cancellation parameters, whereby the calibration signal is effectively subtracted from the signals received by the main receivers, thus avoiding interference from the injected calibration signal in the received traffic signals.

Each radio module may comprise an adjuster arranged to apply the calibration parameters. This adjuster may comprise a FIR (finite impulse response) filter.

DESCRIPTION WITH REFERENCE TO FIGURES

Figure 1B:
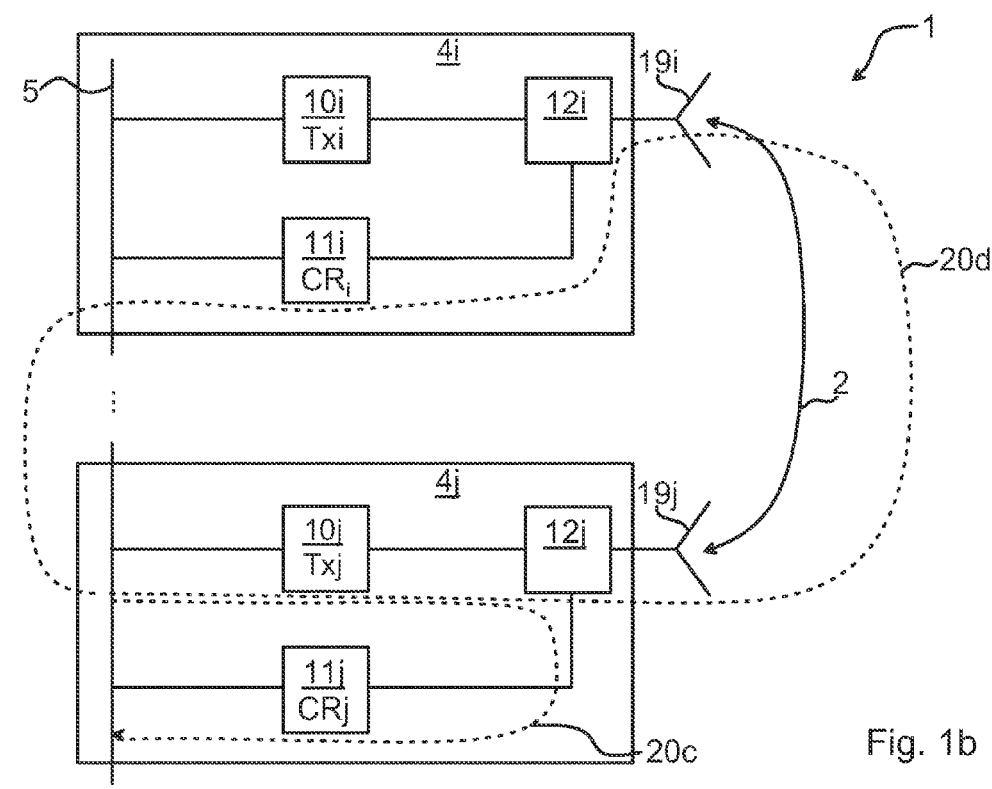
Figure 2A:
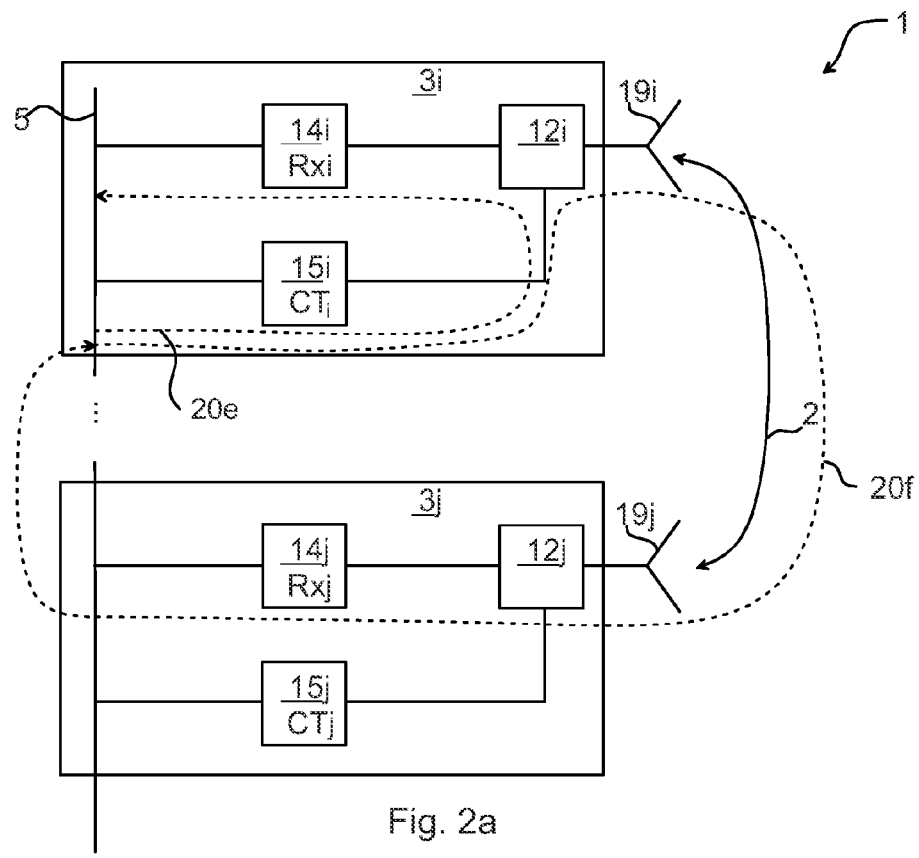
FIGS. 2A-2B are schematic diagrams showing an embodiment utilising main receivers and calibration transmitters.
Figure 2B:
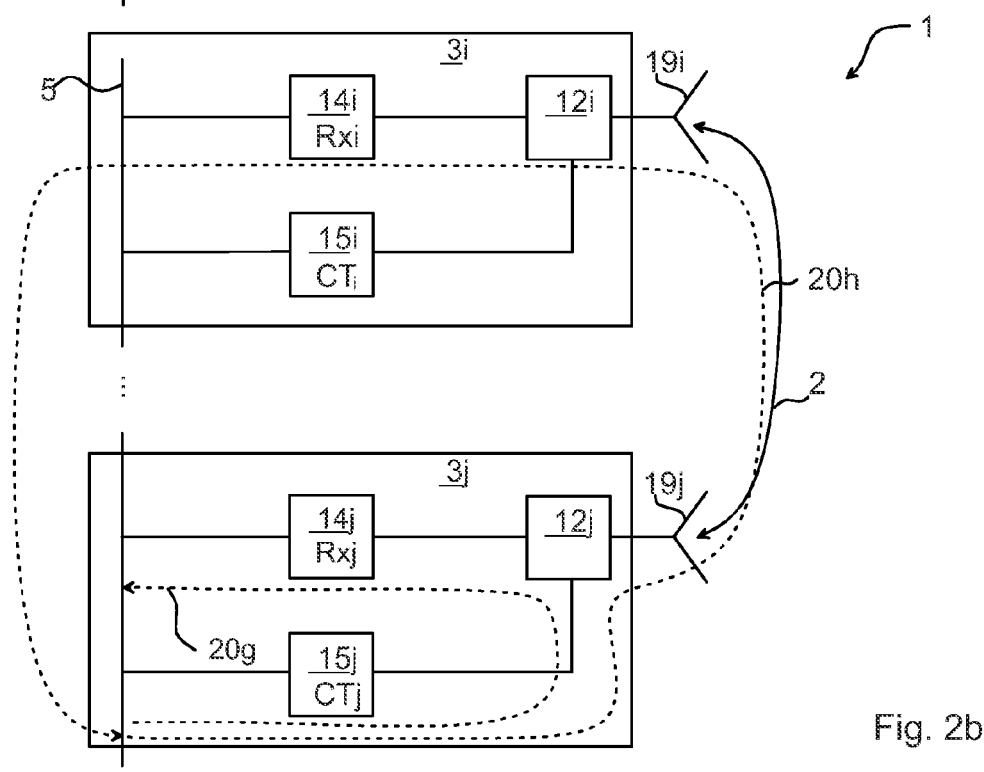

FIGS. 1A-1B are schematic diagrams showing an embodiment utilising main transmitters and calibration receivers, and FIGS. 2A-2B are schematic diagrams showing an embodiment utilising main receivers and calibration transmitters, the embodiment also utilising the mutual coupling between antenna elements. A discussion of the proposed method of calibration of antenna arrays with reference to FIGS. 1A-1B and 2A-2B will now be presented.

$TX_i$ 10$i$ indicates the transmitter of the i:th transmitter radio module 4$i$ and $RX_i$ 14$i$ indicates the receiver of the i:th receiver radio module 3$i$ of an antenna array 1, comprising at least two radio modules. Likewise, $TX_j$ 10$j$ indicates the transmitter of the j:th transmitter radio module 4$j$ and $RX_j$ 14$j$ indicates the receiver of the j:th receiver radio module 3$j$ of the antenna array. Note that the i:th and the j:th radio modules could be situated in the same antenna array module or in adjacent antenna array modules.

Analogous with the transmitters and receivers, $CR_i$ 11$i$ indicates a calibration receiver connected to the i:th transmitter radio module and $CT_i$ 15$i$ indicates a calibration transmitter connected to the i:th receiver radio module. Likewise, $CR_j$ 11$j$ indicates a calibration receiver connected to the j:th transmitter radio module module and $CT_j$ 15$j$ indicates an calibration transmitter connected to the j:th receiver radio module. It is to be noted that the i:th and the j:th calibration receiver or transmitter can share the same physical receiver or transmitter by means of a calibration network connecting several radio modules and antennas to the same calibration receiver or calibration transmitter if these radio modules and antennas are situated in the same antenna array module. An indicated calibration receiver e.g. $CR_i$ 11$i$ or an indicated calibration transmitter e.g. $CT_i$ 15$i$ shall therefore be construed as also including the relevant parts of a calibration network connecting to the i:th transmitting or receiving radio module thus constituting a specific calibration path.

The main purpose of each radio module is to transmit and/or receive radio signals. Any suitable number of radio modules can be part of the antenna array 1. It is to be noted that while RX radio modules are shown in FIGS. 1A-B and TX radio modules are shown in FIGS. 2A-B, one TX and one RX radio module could share the same physical antenna by using a duplexing filter in the radio module. Note also that an antenna could comprise one antenna element or several antenna elements connected in an antenna sub-array.

In FIGS. 1A-1B, two transmitter (TX) radio modules $4i$, $4j$ are shown. A first TX radio module $4i$ comprises a main transmitter $10i$ and has an associated antenna $19i$. A calibration receiver (CR) $11i$ is connected to the main transmitter $10i$ and the antenna $19i$ via a controllable multidirectional coupler $12i$. A second TX radio module $4j$ is of an analogous structure, comprising its own main transmitter $10j$ with associated antenna $19j$. A calibration receiver $11j$ is connected to the main transmitter $10j$ and the antenna $19j$ via a controllable multidirectional coupler $12j$. Note that the i:th and the j:th calibration receiver could share the same physical receiver connected to different transmitter radio modules via a calibration network thus constituting a specific calibration path. A reference plane (RP) 5 is defined which is common to all TX radio modules $4i$, $4j$ of the antenna array 1. Between antenna elements $19i$ and $19j$, there is a mutual coupling 2, also indicated $A_{ij}$ and $A_{ji}$, depending on direction. In the model presented herein, it is assumed that the mutual coupling is reciprocal, i.e. $A_{ij}=A_{ji}$.

In FIGS. 2A-2B, two receiver (RX) radio modules $3i$, $3j$ are shown. A first RX radio module $3i$ comprises a main receiver $14i$ with associated antenna $19i$. A calibration transmitter (CT) $15i$ is connected to the main receiver $14i$ and the antenna $19i$ via a controllable multidirectional coupler $12i$. A second RX radio module $3j$ is of an analogous structure, comprising its own main receiver $14j$ with associated antenna $19j$. A calibration transmitter $15j$ is connected to the main receiver $14j$ via a controllable multidirectional coupler $12j$. Note that the i:th and the j:th calibration transmitter could share the same physical transmitter connected to different receiver radio modules via a calibration network thus constituting a specific calibration path. A reference plane 5 is defined which is common to all RX radio modules $3i$, $3j$ and optionally both to all RX radio modules $3i$, $3j$ and all TX radio modules $4i$, $4j$, of the antenna array 1.

For the multidirectional couplers $12i$-$j$ it is presupposed that the coupling factor is, for all practical purposes, equal for the radio and the antenna sides.

Calibration of antenna arrays 1 involves the calculation of a correction to phase, gain and/or time delay in one or more radio modules in order to align the radio signals at the antenna ports. For both TX and RX, the correction can be applied in the digital domain, as will be explained in more detail with reference to FIG. 3 below.

The radio modules $4i$-$j$ and/or $3i$-$j$ that are shown form part of an antenna array 1 or part of several modules of an antenna array 1. Also indicated in FIGS. 1A-B are four measurement paths $20a$-$d$ of the procedure for calibration of TX radio modules and in FIGS. 2A-B are four measurement paths $20e$-$h$ of the procedure for calibration of RX radio modules.

Between antenna elements $19i$ and $19j$, there is a mutual coupling 2, also indicated $A_{ij}$ and $A_{ji}$, depending on direction. In the model presented herein, it is assumed that the mutual coupling is reciprocal, i.e. $A_{ij}=A_{ji}$.

The reference plane 5 is where the calibration signal is injected or received and then, after completing a specific measurement path $20a$-$h$ is compared or correlated to the original injected signal to obtain a response. This correlation procedure will give the total phase offset, amplitude change and/or delay for the measurement path $20a$-$h$ in question.

The delay along the reference plane 5 between the i:th radio module and the j:th radio module, representing a signal propagation time e.g. between antenna array modules, is denoted by $RP_{ij}$. For antenna calibration purposes it is not presupposed that any delay occurring along the reference plane 5 is known and corrected for. However, if cancellation parameters for the cancellation of calibration signal from the signal received in a receiver module or if antenna mutual couplings $A_{ij}$ are to be calculated for further use, this delay has to be known. It is well known in the art how to obtain this propagation time delay between two points if it is assumed that the delay is reciprocal, i.e. $RP_{ij}=RP_{ji}$. It can be done e.g. by direct clocking the total message time $RP_{ij}+RP_{ji}$ forth and back between the two points in question or by measuring at the two points the difference M1 and M2 in arrival time for two messages sent along paths D1 and D2 from a common point, one of the messages then also passing the link between the points. This will give M1=(D2+RPji)−D1 and M2=(D1+RPij)−D2 and the sought time delay will then be RP=(M1+M2)/2.

It is to be noted that for calibration of the transmitter radio module $4i$, $4j$, it is optionally possible to use the regular radio signal intended for transmission as a calibration signal received by the respective calibration receivers.

Calculation of Numerical Values for Calibration

It will now be presented how, through the use of the different paths $20a$-$h$, numerical values for relative calibration are calculated. The method involves performing a measurement procedure, setting up a number of calibration measurement paths for each pair of radio modules and associated antenna elements. There are four such possible measurement paths, two of which include antenna mutual coupling. From these four measurements the necessary phase, gain and delay corrections can be calculated for the radio modules as well as all characteristics for the calibration modules and for the antenna mutual coupling. The complete measurement and calculation procedure is repeated until all radio modules have been included in at least one procedure and an unbroken chain of relative calibrations between pairs of radio modules have been established.

Consider an active antenna array comprising $N_T$ TX radio modules $4i$, $4j$ and $N_R$ RX radio modules $3i$, $3j$, wherein each module is connected to a corresponding antenna element $19i$, $19j$. Note that the number of TX and RX radio modules need not be the same, i.e. the number N can differ for TX and RX. $TX_i$, $RX_i$ $10i$, $14i$, denotes radio paths, i=1, 2, . . . N for TX and RX, $CR_i$, $CT_i$ $11j$, $15i$, denotes calibration paths with receiver or transmitter, $A_{ij}$ denotes mutual coupling in antenna to antenna paths, where i≠j, $RP_{ij}$ denotes paths in the reference plane 5, i≠j, and $p_{ii}$, $p_{ij}$ denotes responses of measurement paths $20a$-$h$.

A complex transfer function can be defined for each path $$H_i = g_i \cdot e^{j(\omega \tau_i + \phi_i)} \qquad [1]$$

where $g_i$ denotes absolute value of gain, $\tau_i$ denotes delay, $\phi_i$ denotes phase offset and $\omega$ denotes angular frequency.

In order to simplify the calculation formulas, the logarithm of the transfer function will be used in the following equations. The logarithmic version of equation [1] will translate multiplication into addition when calculating the result of combining several blocks into a measurement path or combining the results from several measurements. A commonly used logarithmic value of gain is the dB value defined by dB $(g_i)=20 \cdot \log_{10}(g_i)$. In the following, the designations from FIGS. 1A-B and FIGS. 2A-B $TX_i$, $RX_i$ etc. are used to denote either of calibration entities dB ($g_i$), $\tau_i$ or $\phi_i$ in the different paths 20a-h.

Mean values calculated in some of the following equations will also apply for dB ($g_i$) and this arithmetic mean will translate back into a geometric mean mean($g_i$, $g_j$)=$\sqrt{g_i \cdot g_j}$ when using linear gain values. Using the original linear form of equation [1] will translate addition into multiplication, subtraction into division and dividing by two into square root extraction (as in the geometric mean formula).

TX Calibration

Referring to FIGS. 1A-B, the elements of the measurement path matrix P comprising responses will be $$p_{ii}=TX_i+CR_i \text{ corresponds to path } 20a \qquad [2]$$

$$p_{ij}=TX_i+A_{ij}+CR_j+RP_{ji}, i \neq j \text{ corresponds to path } 20b$$

$$p_{jj}=TX_j+CR_j \text{ corresponds to path } 20c$$

$$p_{ji}=TX_j+A_{ji}+CR_i+RP_{ij}, i \neq j \text{ corresponds to path } 20d$$

The TX antenna coupling matrix $A_{TX}$ has the reciprocal property $$A_{ij}=A_{ji}, i \neq j \qquad [3]$$

Taking the mean of the differences $p_{ij}-p_{ii}$ and $p_{ji}-p_{jj}$, noting that $A_{ij}=A_{ji}$, gives the elements of $A_{TX}$.

$$A_{ij}=\tfrac{1}{2}\{p_{ij}+p_{ji}-(p_{ii}+p_{jj})-(RP_{ij}+RP_{ji})\} \qquad [4]$$

Measurement difference matrices can now be calculated by taking the differences of appropriate sub-equations of equation [2], giving $$dCR_{ii}=CR_i-CR_i=0 \qquad [5]$$

$$dCR_{ij}=CR_i-CR_j=p_{ii}+A_{ji}-p_{ij}+RP_{ji}, i \neq j$$

$$dCR_{ji}=CR_j-CR_i=p_{jj}+A_{ji}-p_{ji}+RP_{ij}, i \neq j \text{ and}$$

$$dTX_{ii}=TX_i-TX_i=0 \qquad [6]$$

$$dTX_{ij}=TX_i-TX_j=p_{ii}+A_{ji}-p_{jj}+RP_{ij}, i \neq j$$

$$dTX_{ji}=TX_j-TX_i=p_{jj}+A_{ij}-p_{ij}+RP_{ji}, i \neq j$$

Taking the mean of $dCR_{ij}$ and $-dCR_{ji}$, and $dTX_{ij}$ and $-dTX_{ji}$, also noting that $A_{ij}=A_{ji}$ and $RP_{ij}=RP_{ji}$ gives $$\overline{dCR}_{ij}=\tfrac{1}{2}\{p_{ii}-p_{jj}-(p_{ij}-p_{ji})\} \text{ and} \qquad [7]$$

$$\overline{dTX}_{ij}=\tfrac{1}{2}\{p_{ii}-p_{jj}+(p_{ij}-p_{ji})\} \qquad [8]$$

The result from equation 8 is the calibration parameter in the form of a correction that should be added to the j:th TX radio module in order to align the signals at the antenna ports i and j. Note that the paths A for the antennas and RP for the reference plane will be cancelled due to the reciprocity conditions. According to the definitions used, this correction could be an added dB gain (or multiplied linear gain factor), a delay or an offset phase angle applied at the actual angular frequency. These corrections, by themselves or combined, can for example be applied at digital base-band by using an appropriately adjusted FIR filter.

The complete TX measurement and calculation procedure is repeated, including other TX radio modules, until all TX radio modules have been included in at least one procedure and an unbroken chain of relative calibrations between pairs of TX radio modules have been established.

RX Calibration

Referring to FIGS. 2A-B, and with a similar discussion as for TX calibration, the elements of the measurement path matrix P will be $$p_{ii}=CT_i+RX_i \text{ corresponds to path } 20e \qquad [9]$$

$$p_{ij}=CT_i+A_{ij}+RX_j+RP_{ji}, i \neq j \text{ corresponds to path } 20f$$

$$p_{jj}=CT_j+RX_j \text{ corresponds to path } 20g$$

$$p_{ji}=CT_j+A_{ji}+RX_i+RP_{ij}, i \neq j \text{ corresponds to path } 20h$$

The RX antenna coupling matrix $A_{RX}$ has the reciprocal property $$A_{ij}=A_{ji}, i \neq j \qquad [10]$$

Taking the mean of the differences $p_{ij}-p_{ii}$ and $p_{ji}-p_{jj}$, noting that $A_{ij}=A_{ji}$, gives the elements of $A_{RX}$.

$$A_{ij}=\tfrac{1}{2}\{p_{ij}+p_{ji}-(p_{ii}-p_{jj})-(RP_{ij}+RP_{ji})\} \qquad [11]$$

Note that this is the same expression as in equation [4].

Measurement difference matrices can now be calculated by taking the differences of appropriate sub-equations of equation [9], giving $$dCT_{ii}=CT_i-CT_i=0 \qquad [12]$$

$$dCT_{ij}=CT_i-CT_j=p_{ii}+A_{ji}-p_{ji}+RP_{ij}, i \neq j$$

$$dCT_{ji}=CT_j-CT_i=p_{jj}+A_{ij}-p_{ij}+RP_{ji}, i \neq j \text{ and}$$

$$dRX_{ii}=RX_i-RX_i=0 \qquad [13]$$

$$dRX_{ij}=RX_i-RX_j=p_{ii}+A_{ij}-p_{ij}+RP_{ji}, i \neq j$$

$$dRX_{ji}=RX_j-RX_i=p_{jj}+A_{ji}-p_{ji}+RP_{ij}, i \neq j$$

Taking the mean of $dCT_{ij}$ and $-dCT_{ji}$, and $dRX_{ij}$ and $-dRX_{ji}$, also noting that $A_{ij}=A_{ji}$ and $RP_{ij}=RP_{ji}$ gives $$\overline{dCT}_{ij}=\tfrac{1}{2}\{p_{ii}-p_{jj}+(p_{ij}-p_{ji})\} \text{ and} \qquad [14]$$

$$\overline{dRX}_{ij}=\tfrac{1}{2}\{p_{ii}-p_{jj}-(p_{ij}-p_{ji})\} \qquad [15]$$

The result from equation [15] is the calibration parameter in the form of a correction that should be added to the j:th RX radio module in order to align the signals at the antenna ports i and j. Note that the paths A for the antennas and RP for the reference plane will be cancelled due to the reciprocity conditions. According to the definitions used, this correction could be an added dB gain (or multiplied linear gain factor), a delay or an offset phase angle applied at the actual angular frequency. These corrections, by themselves or combined, can for example be applied at digital base-band by using an appropriately adjusted FIR filter.

The complete RX measurement and calculation procedure is repeated, including other RX radio modules, until all RX radio modules have been included in at least one procedure and an unbroken chain of relative calibrations between pairs of RX radio modules have been established.

Figure 3:
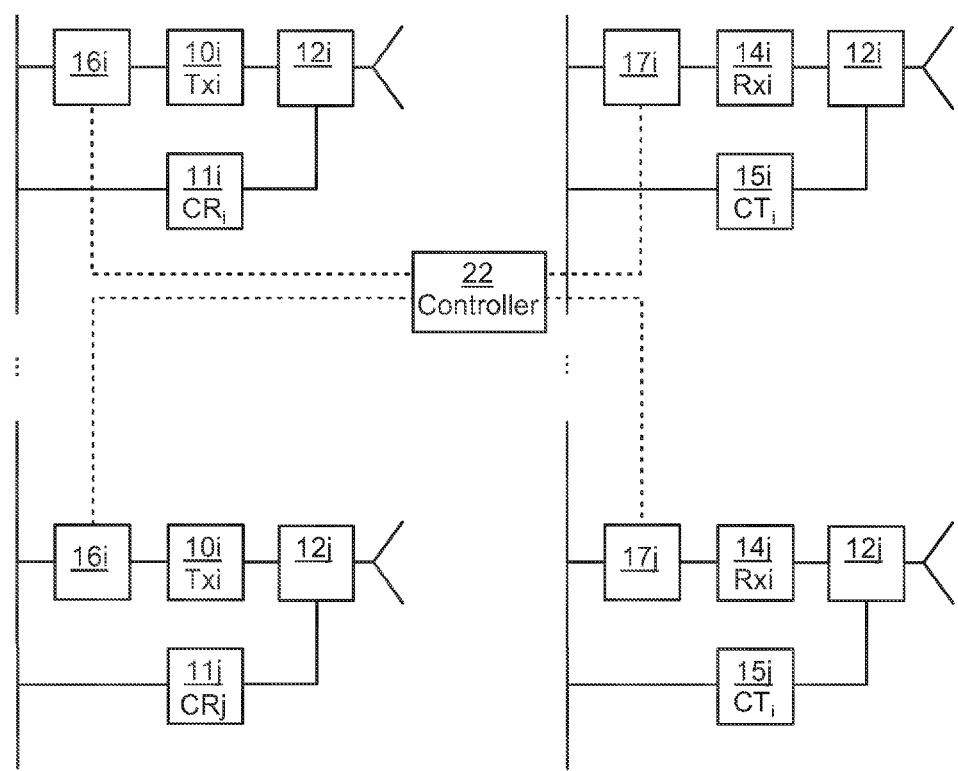
FIG. 3 is a schematic diagram showing an antenna array including adjusters for applying calibration parameters.

FIG. 3 is a schematic diagram showing an antenna array including adjusters for applying calibration parameters. Here each radio module comprises an adjuster to apply calibration parameters as described herein. Each of the TX radio modules 4i-j comprises a respective adjuster 16i-j. Analogously, each of the RX radio modules 3i-j comprises a respective adjuster 17i-j. The adjusters 16i-j, 17i-j can be of any suitable construction allowing calibration parameters to be applied, e.g. FIR filters or similar.

A controller 22 is responsible of overseeing the calibration parameter extraction as explained above, and also to apply the obtained calibration parameters using one or more of the adjusters 16$i$-$j$, 17$i$-$j$.

Figure 4:
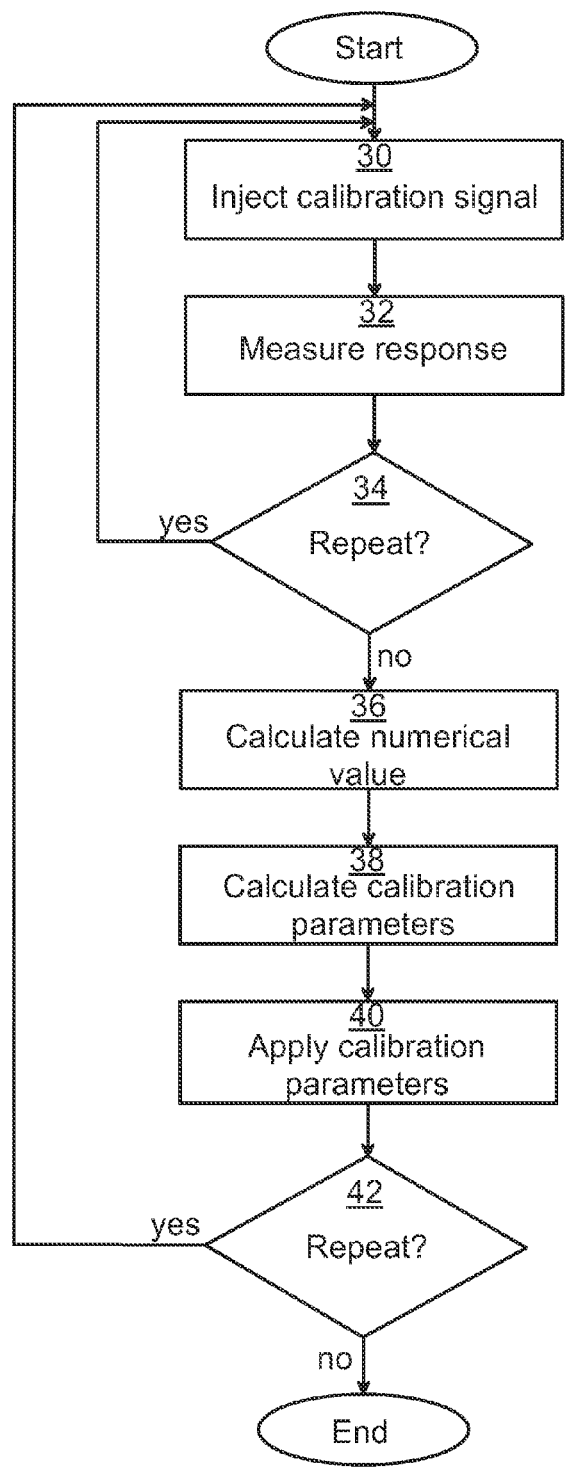
FIG. 4 is a flow chart illustrating a method according to an embodiment.

FIG. 4 is a flow chart illustrating a method according to an embodiment. The method is another way of explaining the procedure presented above with reference to FIGS. 1A-B and FIG. 2A-B. The method is performed in a controller comprised in or connected to the antenna array 1 of FIGS. 1A-B and FIGS. 2A-B, such as controller 22 of FIG. 3.

In an initial inject calibration signal step 30, a calibration signal is injected in a radio module. In the case that the radio module is an RX radio module, the signal is injected via a calibration transmitter CT 15$i$-$j$ and associated calibration network to the coupling point close to the antenna. In the case that the radio module is a TX radio module, the signal can be injected in the radio digital domain or can be the regular radio signal intended for transmission.

In a measure response step 32, a first response to the injected calibration signal is measured in the same first RX radio module as where the calibration signal was injected or in the calibration receiver CR 11$i$ connected to the same first TX radio module. This allows for the first paths 20$e$ for RX and 20$a$ for TX to be measured.

In a repeat step 34, the method returns to step 30, repeating the inject calibration signal step 30 and measure response step 32, selecting different paths e.g. with controllable multidirectional couplers.

The inject response loop is repeated three times measuring in turn a second response to the injected calibration signal in a second different RX radio module from where it was injected or in the calibration receiver CR 11$j$ connected to the second different TX radio module, resulting in measuring paths 20$f$ and 20$b$.

For the last two loops the calibration signal is injected in the second radio module and a third response is measured in the same second RX radio module as where the calibration signal was injected or in the calibration receiver CR 11$j$ connected to the same second TX radio module as where the calibration signal was injected, resulting in measuring paths 20$g$ and 20$c$. A fourth response to the injected calibration signal is measured in the first different RX radio module from where it was injected or in the calibration receiver CR 11$i$ connected to the first different TX radio module from where the calibration signal was injected, resulting in measuring the last paths 20$h$ and 20$d$. The method then proceeds to a calculate numerical value step 36.

In the calculate numerical value step 36, equation [8] is calculated when the current calibration concerns TX radio modules. Otherwise, when the current calibration concerns RX radio modules, equation [15] is calculated.

Once the numerical values have been obtained, calibration parameters are calculated in a calculate calibration parameter step 38. One part of this step can be to compare the numerical value obtained in the previous step with a desired value, e.g. a zero value in the case of minimising a difference between two radio modules. If there is a discrepancy, optionally an absolute discrepancy above a threshold value, appropriate parameters are calculated, e.g. for a FIR filter.

In an apply calibration step 40, any new calibration parameters, e.g. as coefficients for a FIR filter of an adjuster of a radio module are applied.

In a conditional repeat step 42 it is determined if there is any radio module that has not been part of a calibration calculation yet. If this is the case, the method returns to the inject calibration signal step 30, including a new, previously uncalculated, radio module and a radio module which has previously been part of a calibration calculation. Otherwise, the method ends.

Optionally, the calibration method is performed again after an idle period. The idle period can be selected to be any appropriate length, e.g. 10 seconds, 1 minute, 10 minutes, etc.

Figure 5:
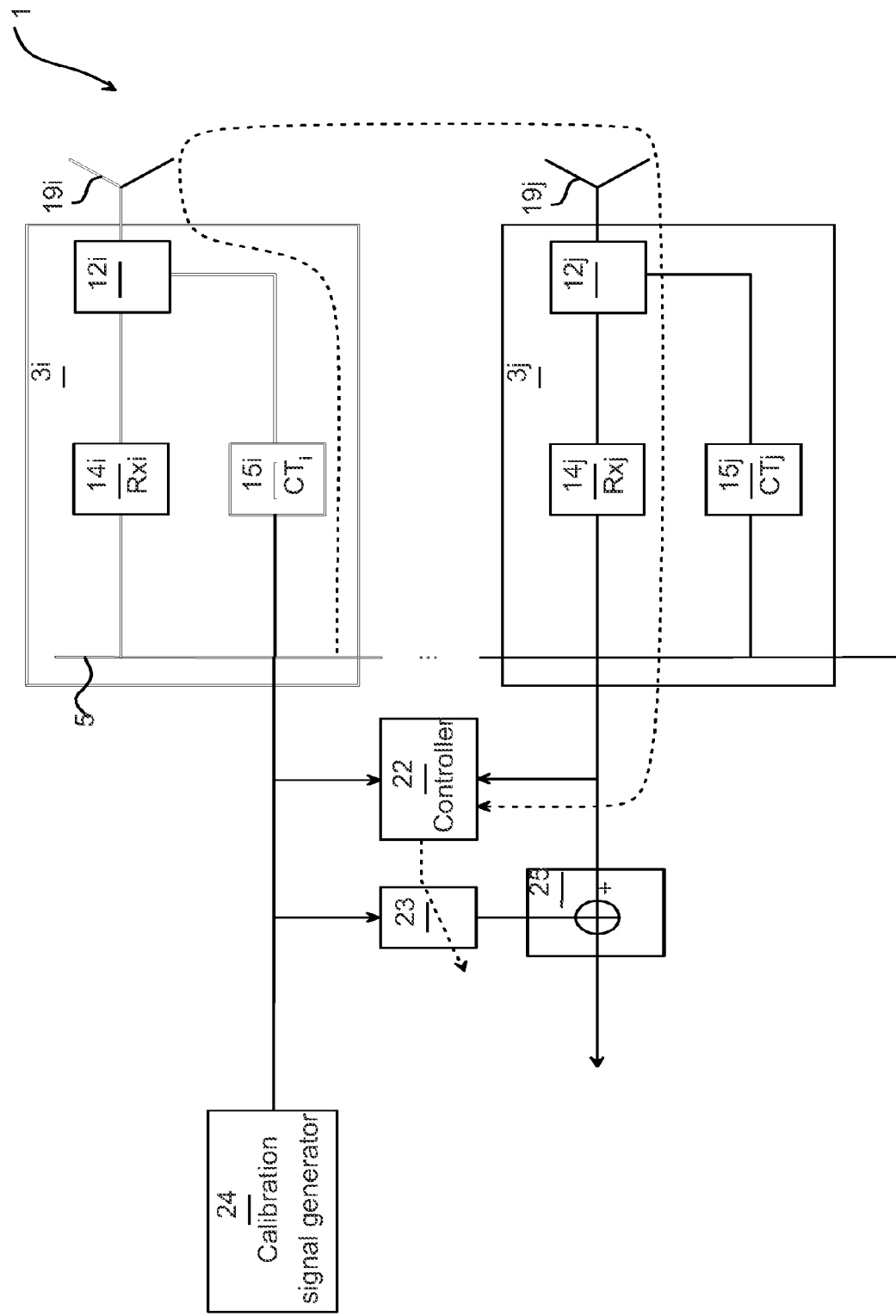
FIG. 5 is a schematic diagram of an antenna array in an embodiment comprising a cancellation circuit.

FIG. 5 is a schematic diagram of an antenna array in an embodiment comprising a cancellation circuit. This is applied to RX radio modules 3$i$-$j$, where an added calibration signal from the calibration transmitters CT will turn up as an interferer and could potentially have disadvantages such as reduced signal to noise ratio, etc. Cancellation of the injected calibration signal will solve this problem. It is to be noted that the cancellation may be imperfect, whereby small parts of the original or correction signal can remain after applying cancellation.

FIG. 5 illustrates the example of path 20$f$ of FIG. 2A. A calibration signal generator 24 generates the calibration signal which is injected in CTi 15$i$. The signal passes to the antenna 19$i$, and by mutual coupling of the antennas over the air, to antenna 19$j$ and is received by receiver RXj 14$j$. The measured signal is input to the controller 22. The controller also has access to the injected signal from the calibration signal generator 24. This is in fact part of the procedure and method described earlier and by referring to equation [9] for path 20$f$ and noting that the path shall be taken only as far as to the subtractor 25, the proper correction to apply to the adjuster 23 will be $$c_{ij} = CT_i + A_{ij} + RX_j - RP_{ji} \quad [16]$$

In terms of equation [9] this can also be expressed as $$c_{ij} = p_{ij} - 2 \cdot RP_{ji} \quad [17]$$

By subtracting the adjusted generated calibration signal from the received signal in a subtractor 25, the effects of the injected calibration signal in the received signal are greatly reduced or even essentially eliminated. Note that this cancellation can be used to cancel the injected calibration signal for any of paths 20$e$-$h$ by referring to the appropriate part of equation [9]. Note also that the delay RP along the reference plane has to be known in this case. Methods to obtain this delay are well known in the art as has been shown earlier in this description.

In this way, injected calibration signals using CT are essentially removed from the received signal for RX radio modules. This allows calibration to be performed on-line for RX, without any significant effect on regular radio traffic. For TX this is already the case, since the level of the regular input signal intended for transmission is known and hence the level and spectral distribution of the injected calibration signal can be chosen so it will not interfere with the transmitted signal. Also, as an option, the regular input signals intended for transmission can be used as calibration signals for the TX modules.

Figure 6:
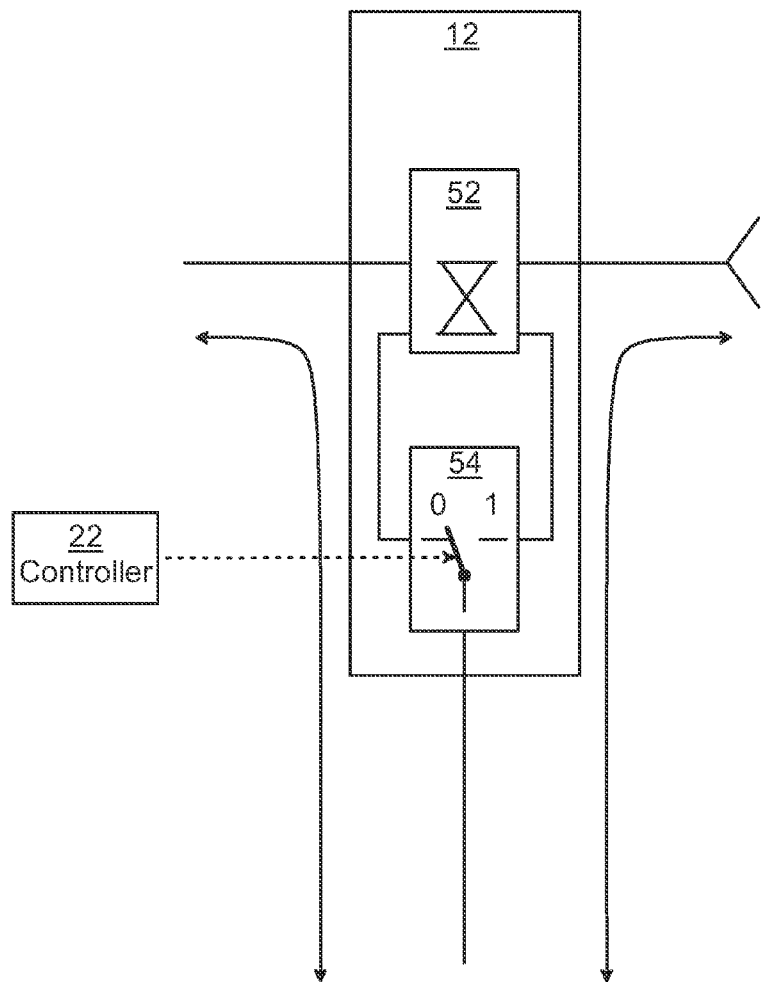
FIG. 6 is a schematic diagram of a coupler according to an embodiment.

FIG. 6 is a schematic diagram of a coupler according to an embodiment. The coupler has a coupler 52 and a switch 54. The switch 54 is controlled by the controller 22 and can be set to connect calibration transmitters or receivers, connected below the switch 54 via a calibration network, either to antenna 19 connected to the right of coupler 12 or to main transmitter(10)/receiver(14) connected to the left of coupler 12.

CONCLUSION

As has been shown, the pair-wise differences $\overline{d}TX_{ij}$ and $\overline{d}RX_{ij}$ from equations [8] and [15] give the sought-for relative corrections that should be applied to pairs of TX or RX radio modules in order to align phase and delay, and possibly also gain (the equations giving the logarithmic gain or dB value), at the antenna ports of the antenna array or a configuration of several antenna array modules.

An antenna port should be construed as the point of electrical connection to an antenna element or an antenna subarray. However, the alignment is in fact performed at the multidirectional coupling point and therefore an alignment at the antenna ports presupposes that the paths between the coupling points and the respective antenna ports are uniform (or are known and corrected for). The criterion of uniformity is often easily fulfilled by design by placing the coupling point close to the antenna thereby minimizing the electrical path and variations in it. The method proposed herein therefore gives the sought alignment at the antenna ports for all practical purposes.

For an antenna array with N radio modules with associated antennas there are $(N-1)N/2$ mean difference values that are possible to calculate according to equations [8] and [15]. This means that it is often possible to calculate the difference value between two radio modules associated with antenna elements placed far apart by several different measurement chains connecting neighboring antenna elements, using the steps of the proposed method. Furthermore, it is possible to solve for the difference values in a least mean square sense by using more difference values than the required minimum number $N-1$, thereby increasing the accuracy of the calibration.

The results from equations [7] and [14] for the calibration receiver and calibration transmitter paths, including also the calibration network connecting to the coupler points, are not needed explicitly for the antenna calibration and the differences in these paths do not need to be corrected for. However, it should be noted that these calibration paths are implicitly included in the proposed method and that any variations and differences in these paths are therefore accounted for and implicitly corrected for as frequent as the calibration of radio modules is performed. The proposed method therefore solves the problem of characterizing the calibration HW (hardware) and achieving the same accuracy as in the calibration of the radio transmitter and receiver HW. It also solves the problem of ageing and temperature drift affecting the calibration paths as well as the regular radio transmitter and receiver paths.

Because of the use of antenna mutual coupling in the proposed method, the necessary calibration HW (e.g. calibration coupler network, calibration receiver/transmitter, signal correlator and calibration signal generator) can be made local to one antenna array module, while extending the calibration to encompass several antenna array modules.

Nor are the results from equations [4] and [11] for the antenna coupling matrices needed explicitly, but can be used in demanding applications when the antenna beam pattern needs to be corrected to a better accuracy. If this is the case any delay occurring along the reference plane must be known. It is well known in the art how to obtain this propagation time delay as has been shown earlier in this description.

Figure 7:
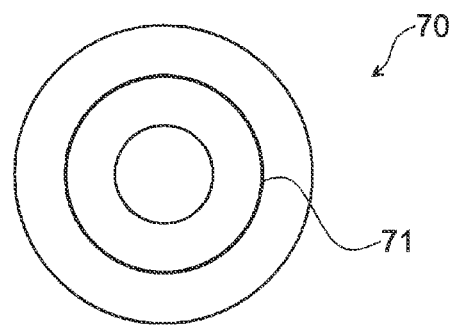
FIG. 7 shows one example of a computer program product comprising computer readable means.

FIG. 7 shows one example of a computer program product 70 comprising computer readable means. On this computer readable means a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory connected to the controller 22. While the computer program 71 is here schematically shown as a track on the depicted optical disk, the computer program can be stored in any way which is suitable for the computer program product.

Figure 8:
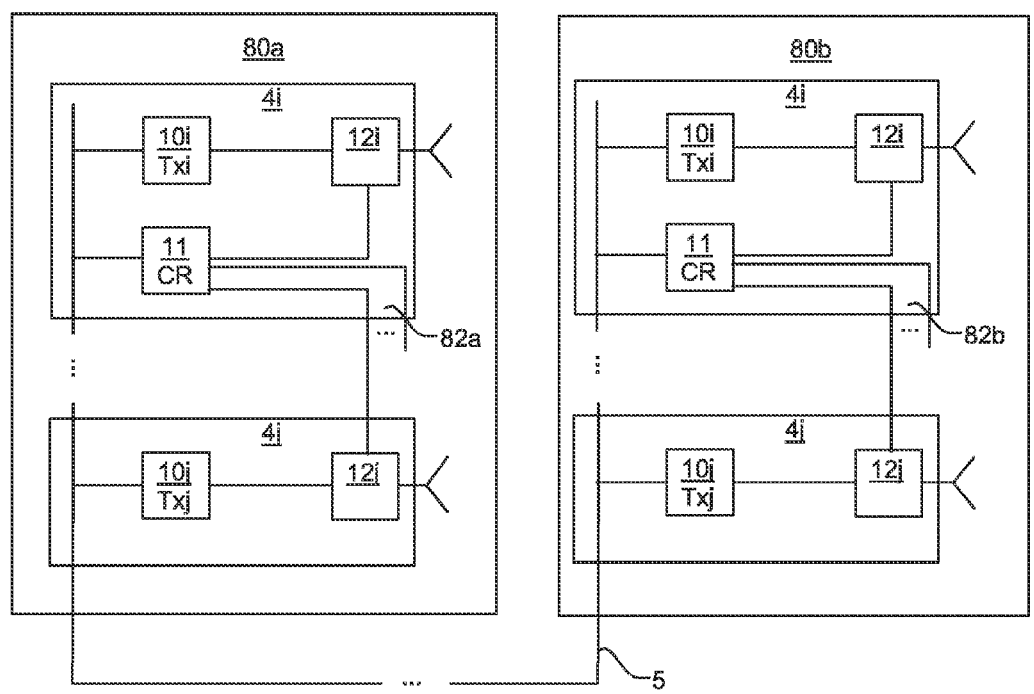
FIG. 8 is a schematic diagram illustrating antenna array modules.

FIG. 8 is a schematic diagram illustrating antenna array modules. Here it is shown how the antenna array 1 is divided into two antenna array modules 80*a-b*. Each antenna array module 80*a-b* comprises a plurality of radio modules 4*i-j* each comprising a main transmitter 10*i-j*. Through the use of a respective calibration network 82*a-b*, selective connection of a calibration receiver 11 is made possible. The antenna array modules are connected via the reference plane 5. Analogously, the antenna array may be arranged with radio modules 3*i-j* comprising main receivers, or radio modules comprising both main receivers and main transmitters.

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

The invention claimed is:

1. A method for obtaining at least one calibration parameter for an antenna array, the antenna array comprising a first and a second radio module, a first antenna and a second antenna respectively connected to the first and second radio modules, wherein the first and second radio modules each comprises a main transmitter and a selectively connectable calibration receiver or the first and second radio modules each comprises a main receiver and a selectively connectable calibration transmitter, the method comprising:

injecting a first calibration signal in the first radio module and measuring a first response to the first calibration signal in the first radio module;

injecting a second calibration signal in the first radio module that passes over mutual coupling of the antennas to the second radio module, and measuring a second response to the second calibration signal in the second radio module;

injecting a third calibration signal in the second radio module and measuring a third response to the third calibration signal in the second radio module;

injecting a fourth calibration signal in the second radio module that passes over mutual coupling of the antennas to the first radio module, and measuring a fourth response to the fourth calibration signal in the first radio module;

calculating at least one numerical value using the first, second, third and fourth responses;

calculating at least one calibration parameter based on the calculated numerical value and applying the at least one calibration parameter to one of the first and second radio modules using a finite impulse response (FIR) filter.

2. The method according to claim 1, wherein measuring a first, second, third and fourth response each comprises correlating a respective response with a respective calibration signal.

3. The method according to claim 1, wherein measuring a first, second, third and fourth response each comprises measuring a magnitude comprising a phase, delay or logarithmic gain, and wherein the at least one calibration parameter is directed towards adjusting said magnitude to approach a desired value.

4. The method according to claim 1, wherein, when the first and second radio modules each comprise a respective main transmitter, and wherein injecting a first, second, third and fourth calibration signal comprises injecting regular input signals for transmission as calibration signals.

5. The method according to claim 1, wherein, when the first and second radio modules each comprise a respective main receiver, and wherein the method further comprises calculating at least one cancellation parameter using the numerical value, applying the at least one cancellation parameter, and subtracting the injected calibration signal from the response received by the main receivers.

6. The method according to claim 1, wherein calculating at least one numerical value comprises performing numerical combination of mean values and differences of the first, second, third and fourth responses.

7. The method according to claim 1, wherein the method is repeated when there is any radio module for which at least one calibration parameter remains to be calculated and, wherein, in the repeated execution, at least one of the first and second radio modules is a radio module used in a previous execution of the method.

8. The method according to claim 7, wherein during the repeated execution, a previously utilised calibration receiver or calibration transmitter is reused to form part of a radio module used in the repeated execution.

9. The method according to claim 1, wherein the first and second radio modules are connected to separate calibration networks.

10. The method according to claim 1, wherein the method is repeated after an idle period.

11. An antenna array comprising a controller, a first and a second radio module, and a first antenna and a second antenna respectively connected to the first and second radio modules, wherein the first and second radio modules each comprises a main transmitter and a selectively connectable calibration receiver or the first and second radio modules each comprises a main receiver and a selectively connectable calibration transmitter, and wherein the controller is configured to:
  inject a first calibration signal in the first radio module and measure a first response to the first calibration signal in the first radio module;
  inject a second calibration signal in the first radio module that passes over mutual coupling of the antennas to the second radio module, and measure a second response to the second calibration signal in the second radio module;
  inject a third calibration signal in the second radio module and measure a third response to the third calibration signal in the second radio module;
  inject a fourth calibration signal in the second radio module that passes over mutual coupling of the antennas to the first radio module and measure a fourth response to the fourth calibration signal in the first radio module;
  calculate at least one numerical value using the first, second, third and fourth responses, and
  calculate at least one calibration parameter based on the calculated numerical value; and
  at least one radio module further comprises an adjuster configured to apply the at least one calibration parameter, wherein the adjuster comprises a finite impulse response (FIR) filter.

12. The antenna array according to claim 11, further comprising a calibration network configured to selectively connect a calibration receiver or calibration transmitter within a radio module.

13. The antenna array according to claim 11, further comprising a plurality of calibration networks each configured to selectively connect a calibration receiver or calibration transmitter within a radio module.

14. The antenna array according to claim 11, wherein each radio module further comprises a controllable multidirectional coupler and the calibration receiver or calibration transmitter is connected within each radio module via the controllable multidirectional coupler.

15. The antenna array according to claim 11, wherein the first and second radio modules each comprise a respective main receiver, and wherein the controller is configured to calculate at least one cancellation parameter, based on at least one calculated numerical value from the first, second, third or fourth responses, for subtracting the calibration signal from the signal received by the main receivers.

16. The antenna array according to claim 15, further comprising an adjuster configured to apply the at least one cancellation parameter to obtain an adjusted signal and a subtractor arranged to subtract the adjusted signal from the response received by a main receiver.

17. The antenna array according to claim 16, wherein the adjuster that is configured to apply the at least one cancellation parameter comprises a finite impulse response (FIR) filter.

18. A computer program stored on a non-transitory computer readable medium and comprising computer program code that, when executed by a controller of an antenna array, causes the controller to obtain at least one calibration parameter for the antenna array, the antenna array comprising at least a first and a second radio module, a first antenna and a second antenna respectively connected to the first and second radio modules, wherein the first and second radio modules each comprises a main transmitter and a selectively connectable calibration receiver or the first and second radio modules each comprises a main receiver and a selectively connectable calibration transmitter, and wherein the computer program code causes the controller to:
  inject a first calibration signal in the first radio module and measuring a first response to the first calibration signal in the first radio module;
  inject a second calibration signal in the first radio module that passes over mutual coupling of the antennas to the second radio module, and measuring a second response to the second calibration signal in the second radio module;
  inject a third calibration signal in the second radio module and measuring a third response to the third calibration signal in the second radio module;
  inject a fourth calibration signal in the second radio module that passes over mutual coupling of the antennas to the first radio module and measuring a fourth response to the fourth calibration signal in the first radio module;
  calculate at least one numerical value using the first, second, third and fourth responses;
  calculate at least one calibration parameter based on the calculated numerical value; and
  apply the at least one calibration parameter to one of the first and second radio modules using a finite impulse response (FIR) filter.

* * * * *

UNITED STATES PATENT AND TRADEMARK OFFICE
CERTIFICATE OF CORRECTION

PATENT NO. : 8,416,126 B2
APPLICATION NO. : 12/957949
DATED : April 9, 2013
INVENTOR(S) : Malmqvist et al.

It is certified that error appears in the above-identified patent and that said Letters Patent is hereby corrected as shown below:

In the Specification

In Column 8, Lines 16-17, delete "M1=(D2+RPji)-D1 and M2=(D1+RPij)-D2" and insert -- M1=(D2+RP$_{ji}$)-D1 and M2=(D1+RP$_{ij}$)-D2 --, therefor.

In Column 10, Line 27, delete

" $dCT_{ij} = CT_i - CT_i = p_{ii} + A_{ji} - p_{ji} + RP_{ij}, i \neq j$ " and insert -- $dCT_{ij} = CT_i - CT_j = p_{ii} + A_{ji} - p_{ji} + RP_{ij}, i \neq j$ --, therefor.

In the Claims

In Column 14, Line 51, in Claim 1, delete "value and" and insert -- value; and --, therefor.

Signed and Sealed this
Twenty-second Day of October, 2013

Teresa Stanek Rea
*Deputy Director of the United States Patent and Trademark Office*